Jan. 24, 1939.  P. H. BERGER  2,144,604
COMBINED PROTRACTOR AND TRAMMEL INSTRUMENT
Filed Jan. 12, 1938   2 Sheets-Sheet 1
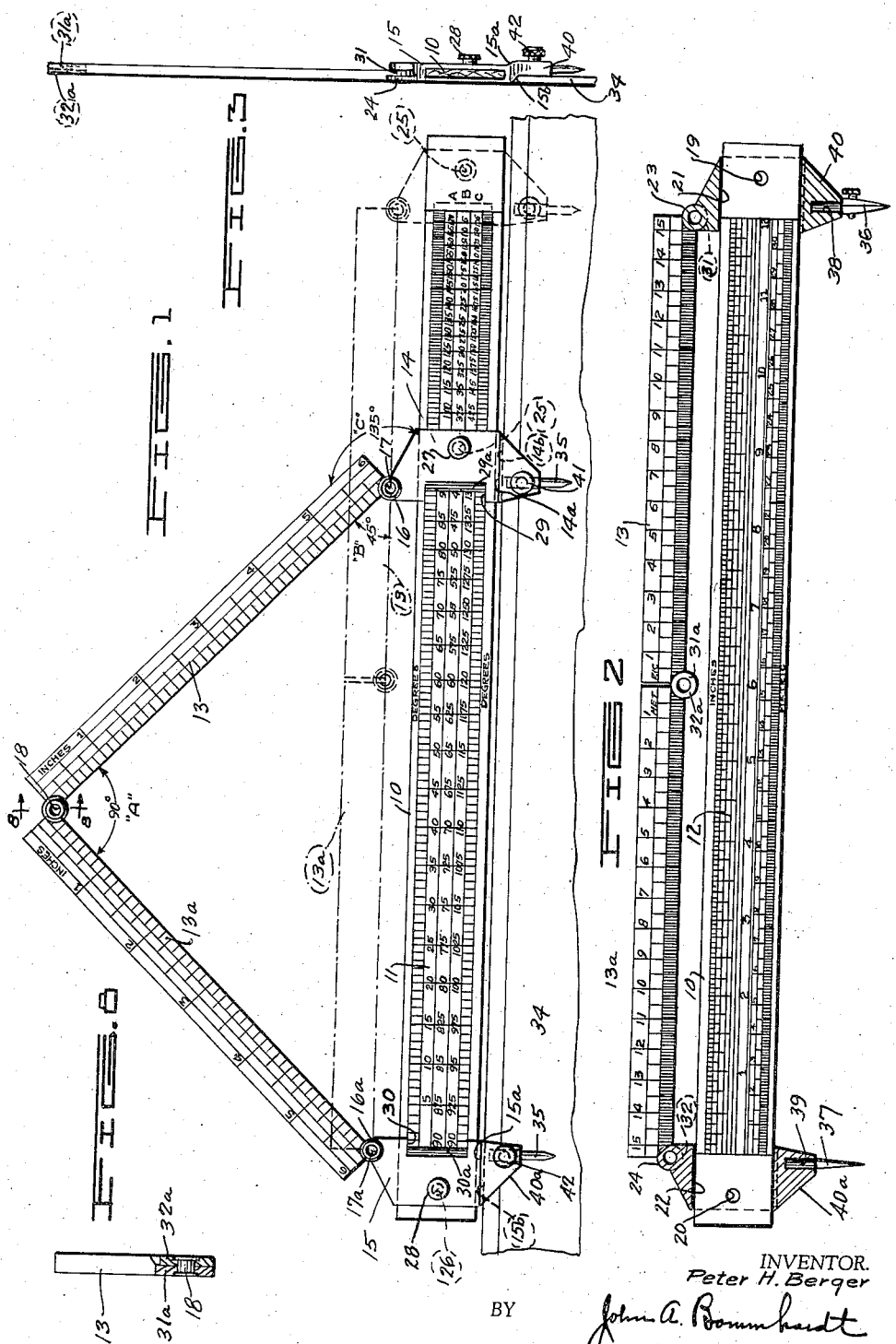
INVENTOR.
Peter H. Berger
BY John A. Bommhardt
ATTORNEY.

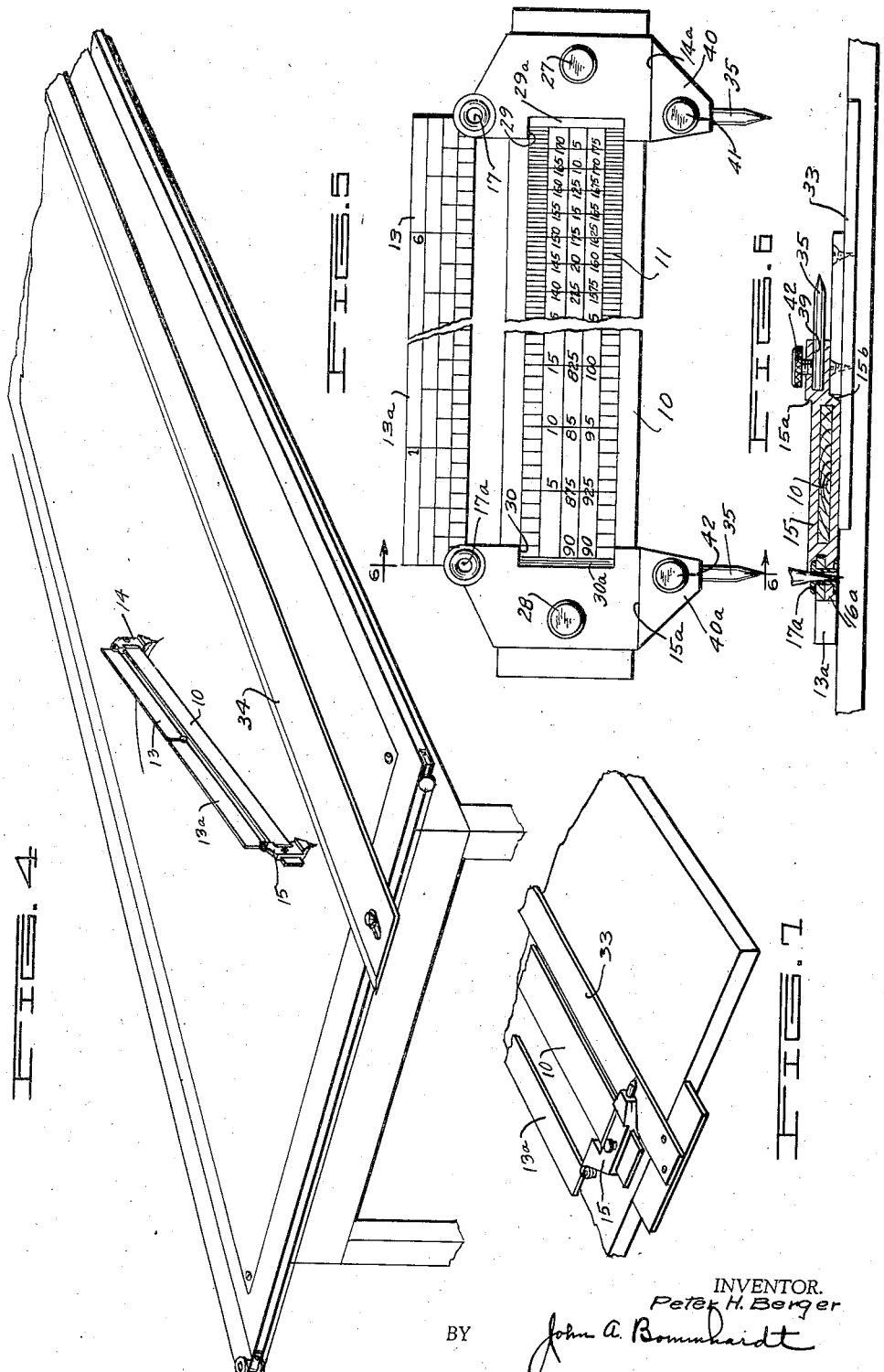

Patented Jan. 24, 1939

2,144,604

UNITED STATES PATENT OFFICE 2,144,604

COMBINED PROTRACTOR AND TRAMMEL INSTRUMENT

Peter H. Berger, Geneva, Ohio

Application January 12, 1938, Serial No. 184,522

3 Claims. (Cl. 33—158)

My invention relates to improvements in combined protractors and trammel instruments and is intended to serve architects, engineers, draftsmen, builders, mechanics, students and scholars, its features are many and are believed to be of great importance.

One object is to embody the best features of both the protractor and the trammel instruments in such manner as to provide a desired result instantly, such as angles, radii and the like; another of its objects is the simplification of geometric construction, which will bisect a line, draw a parallel line to another, draw a perpendicular line to another at any given point and draw triangles with definite lengths in less steps than a compass and straight edge will do.

A further object is to provide a device of rigid construction and accuracy and one that is easy to handle for instant adjustments.

These and other objects may be seen from the following specification and its accompanying illustrations, in which:—

Fig. 1 is a top plan view of the device when resting against a straight edge, the method for obtaining a desired angle being shown by the position of the trammel instruments on the degree scale, dot-dash lines show the normal position of the angle scale.

Fig. 2 shows the reverse side of the degree scale and the pivoted angle scale, when the inch and/or metric scales are desired.

Fig. 3 is a left end view of Fig. 1.

Fig. 4 is a perspective view showing the trammel instruments being used with the scale to provide a compass when a circle is being drawn.

Fig. 5 is an enlarged fragmentary view of the opposite ends of the scale and attached trammel instruments.

Fig. 6 is a section taken approximately on line 6—6 of Fig. 5, but illustrative of its position in relation to a T-square when lying flat against it.

Fig. 7 is a perspective of a fragment of the device in the position illustrated in Fig. 6.

Fig. 8 is a section through a pivot on line 8—8 of Fig. 1.

Again referring to the drawings, the structure herein illustrated comprises a reversible rule 10, which has a graduated scale on both front face 11 and rear face 12, a split pivotal rule 13 and 13a and right and left trammel instruments 14 and 15 respectively to which the split pivotal rule 13 and 13a is pivotally attached at opposed ends 16 and 16a by hollow pivot pins 17 and 17a.

The reversible rule 10 has, preferably, imprinted thereon on its opposite surfaces, a scale 12 in inches and metrics on the one and a scale 11 in degrees on the other. The opposed ends of the reversible rule have threaded apertures 19 and 20 therein adjacent each end.

The right and left hand trammels or heads 14 and 15 have slots 21 and 22 therethrough, respectively, slightly larger than the width and thickness of the reversible rule 10, and the top of the trammels 14 and 15 taper from above the slots 21 and 22 to rounded lugs 23 and 24 which are approximately one half the thickness of the trammel as specifically illustrated in Fig. 6; threaded apertures 25 and 26 therethrough adjacent the outer edges of the trammels 14 and 15 respectively have adjustment screws 27 and 28 mounted therein.

The inside edges of the trammels 14 and 15 are recessed at 29 and 30 respectively, a graded portion 29a and 30a tapering downward to the surface of the rule 10.

The split rule 13 and 13a has circular lugs 31 and 32, 31a and 32a, at opposite ends thereof, respectively as illustrated in Fig. 8, hollow rivets or pivot pins 17, 17a and 18 pivotally securing the end lugs 31 and 32a to the lugs 24 and 23 of the left and right trammels 15 and 14 and the left and right lugs 32 and 31a of the split rule 13a and 13. This split rule also has a scale imprinted on both front and back surfaces as illustrated in Figs. 1 and 2.

The lower portions of the trammels 14 and 15 are shouldered at 14a and 15a respectively on their top surfaces and 14b and 15b on their bottom surfaces to allow the trammels to lie flat on the table surface and against the edge of a T-square 33 or straight edge 34, with the pencil 35, pen 36 or point finder 37 projecting over the surface of the said T-square or straight edge as specifically shown in Fig. 6.

The pencil 35, pen 36 or point finder 37 is mounted in apertures 38 and 39 in the split shouldered lower tapered portion 40 and 40a of the trammels 14 and 15 respectively and is secured therein by adjustment screws 41 and 42.

In the use of the combined instrument, right and left hand trammel instruments 14 and 15 are superimposed over the ends of the rule 10, the scale 11 or 12, which ever is used, being face up, the adjustment screws 27 and 28 securing the trammels in their desired positions on the rule 10, as for example the position illustrated in Fig. 1; the adjustment screw 28 is screwed through the aperture 26 in the trammel 15 and into the threaded aperture 20 registering therewith which thus holds the trammel 15 rigidly in position on the rule 10, the inner graded edge of the recess 30 resting upon the extreme left position of the scale 11. The 45°, 90° and/or 135° angles as designated at A, B, and C on the scale 11 being desired, therefore the right trammel 14 is moved to a position on the scale 11, directly above the degrees so numbered, the adjustment screw 27 in the trammel is screwed down until the pressure of the point is against the surface of the scale 11 retaining the trammel 14 at that position; the split rule 13 and 13a pivots at each end and in the middle, the split center rising and assuming an angular position, the degrees desired being shown and mentioned at the points wherein they are in evidence is illustrated in Fig. 1.

The device may be used also as a compass as shown in Fig. 4, and, by the use of pencil points though the hollow rivets or pivots 17, 17a and/or 18, it may be used to centralize the points of the angles and for many other uses.

It will be seen that the device, as hereinabove described, embodies the simplicity of construction and accuracy of adjustment which is necessary to the type of work that this combination of instruments aids.

I claim:

1. A combined protractor and trammel comprising a rule forming the trammel beam, a pair of trammel heads adjustable along the same, and a pair of rule sections pivoted to each other and respectively to the heads and adjustable to parallelism with each other and with one edge of the beam, and one side face of the rule sections being in the same plane as one face of the heads, whereby the rule sections and heads will lie flatly upon a plane surface.

2. An instrument comprising a continuous straight-edge beam having scales of angles and distances thereon, a pair of heads adjustable along the beam, and a pair of rule sections pivoted to each other at their inner ends and to the heads respectively at their outer ends, the joint between the rule sections being a butt joint whereby the rule sections may be brought to parallelism to each other and to the edge of the beam, and one side of the rule sections being in the same plane as each other and as one side of the heads, whereby the rule sections and the heads will all lie in continuous contact with a plane surface when the instrument is laid flatly on said surface.

3. An instrument as in claim 2, the said side of the heads having a shoulder offset with respect to its underside so as to fit against a straight edge upon said surface.

PETER H. BERGER.